(12) United States Patent
Chowdhury et al.

(10) Patent No.: US 12,235,225 B2
(45) Date of Patent: Feb. 25, 2025

(54) SYSTEMS AND METHODS FOR NON-INTRUSIVE MATERIAL QUALITY INSPECTION USING THREE-DIMENSIONAL MONOSTATIC RADAR BASED IMAGING

(71) Applicant: Tata Consultancy Services Limited, Mumbai (IN)

(72) Inventors: Arijit Chowdhury, Kolkata (IN); Anwesha Khasnobish, Kolkata (IN); Smriti Rani, Kolkata (IN); Achanna Anil Kumar, Bangalore (IN); Soumya Chakravarty, Kolkata (IN); Arpan Pal, Kolkata (IN); Tapas Chakravarty, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 231 days.

(21) Appl. No.: 18/185,476

(22) Filed: Mar. 17, 2023

(65) Prior Publication Data
US 2023/0358691 A1    Nov. 9, 2023

(30) Foreign Application Priority Data
May 6, 2022   (IN) .............................. 202221026491

(51) Int. Cl.
*G01N 22/02*   (2006.01)
*G01S 7/41*   (2006.01)
(Continued)

(52) U.S. Cl.
CPC .............. *G01N 22/02* (2013.01); *G01S 7/412* (2013.01); *G01S 13/532* (2013.01); *G01S 13/9064* (2019.05)

(58) Field of Classification Search
CPC ..... G01N 22/02; G01S 13/9064; G01S 7/412; G01S 13/532
See application file for complete search history.

(56) References Cited

U.S. PATENT DOCUMENTS 7,834,802 B2 * 11/2010 Keller ................ G01N 21/3581
342/179
8,946,641 B2    2/2015 Smith et al.
(Continued)

FOREIGN PATENT DOCUMENTS

WO    WO 94/29744    12/1994
WO    WO 2013186559 A2    12/2013

OTHER PUBLICATIONS

S. Rani et al., "A Novel Inverse SAR Microwave Imaging Technique using Ultra Wideband Pulsed Radar," 2022 30th European Signal Processing Conference (EUSIPCO), Belgrade, Serbia, 2022, pp. 1891-1895 (Year: 2022).*

(Continued)

*Primary Examiner* — Ladimir Magloire
*Assistant Examiner* — Bongani Jabulani Mashele
(74) *Attorney, Agent, or Firm* — FINNEGAN, HENDERSON, FARABOW, GARRETT & DUNNER LLP

(57) ABSTRACT

This disclosure relates generally to material quality inspection. Conventional approaches available for material quality inspection are unable to address concerns of complexity and cost involved. The technical problem of occluded object detection and material quality inspection for intrinsic defects identification is addressed in the present disclosure. The present disclosure provides a system and method for non-intrusive material quality inspection using three-dimensional monostatic radar based imaging, where the object under inspection undergoes a circular translation motion on a rotating platform. A modified delay-and-sum (m-DAS)

(Continued)

algorithm is built by incorporating virtual antenna array to obtain a 3D image reconstruction of the object. From 3D reconstructed images, radial displacement as well as the angular locations of the object is identified which are further used for quality inspection of the material comprised in the object.

15 Claims, 16 Drawing Sheets

(51) Int. Cl.
*G01S 13/532* (2006.01)
*G01S 13/90* (2006.01)

(56) References Cited

U.S. PATENT DOCUMENTS

| | | |
|---|---|---|
| 10,871,468 B2 | 12/2020 | Das et al. |
| 2012/0235849 A1* | 9/2012 | Tatoian ................ G01S 13/888 342/21 |

OTHER PUBLICATIONS

Jinglun FENG et al. "Robotic Inspection and 3D GPR-based Reconstruction for Underground Utilities," Computer Vision and Pattern Recognition, Jun. 2021, Arxiv, https://arxiv.org/pdf/2106.01907.pdf.

* cited by examiner

| Acquiring, a first set of radar return data from a first reflected signal and a second set of radar return data from a second reflected signal, the first reflected signal being a signal reflected off a first sample setup and the second reflected signal being a signal reflected off a second sample setup in response to a transmitted signal from a single static radar positioned at a predefined inclination from the first sample setup and the second sample setup, wherein the first sample set up comprises a mechanical rotating platform and the second sample set up comprises an object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix | → 202 |
|---|---|
| Performing, a non-coherent subtraction between the first set of radar return data and the second set of radar return data to obtain a resultant radar return data, wherein resultant radar return data is indicative of a background subtracted range time matrix | → 204 |
| Performing, a plurality of preprocessing steps on the resultant radar return data to obtain a processed range time matrix | → 206 |
| Applying, a range-doppler processing technique on the processed range time matrix to obtain a range-gated matrix indicative of a range time matrix constrained to an observation window | → 208 |
| Creating, a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar | → 210 |
| Iteratively performing, steps 202 through 210 to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights | → 212 |
| Obtaining, a three-dimensional reconstructed image of the object under inspection by combining the plurality of transverse plane images | → 214 |

FIG. 2

SYSTEMS AND METHODS FOR NON-INTRUSIVE MATERIAL QUALITY INSPECTION USING THREE-DIMENSIONAL MONOSTATIC RADAR BASED IMAGING

PRIORITY CLAIM

This U.S. patent application claims priority under 35 U.S.C. § 119 to: India Application No. 202221026491, filed on May 6, 2022. The entire contents of the aforementioned application are incorporated herein by reference.

TECHNICAL FIELD

The disclosure herein generally relates to the field of material quality inspection, and, more particularly, systems and methods for non-intrusive material quality inspection using three-dimensional monostatic radar based imaging.

BACKGROUND

Identification of concealed objects is considered as an imperative challenge in industrial scenarios where an object is ought to be recognized without even opening its enclosure. Further, a prerequisite for occluded object, metallic or non-metallic, inside boxes/casings, is an ability to penetrate through layers of occlusion. A standard alternative is to implement imaging based identification such as radar microwave imaging in occluded spaces owing to its unobtrusive sensing potency. Radar based microwave imaging is broadly categorized as radar based imaging and microwave tomography. Further, millimeter wave (MMW) radar based occluded object detection is also used. For detecting presence of a given object in a sealed package, a conventional concept of using a large array of antennas may be employed. However, high complexity and use of costly switches are a problem with this conventional concept rendering it practically undesirable.

SUMMARY

Embodiments of the present disclosure present technological improvements as solutions to one or more of the above-mentioned technical problems recognized by the inventors in conventional systems. For example, In an aspect, there is provided a system comprising: a mechanical rotating platform; an object under inspection positioned on the mechanical rotating platform; a single static radar positioned at a positioned at a predefined inclination from the object under inspection and the mechanical rotating platform; and a controller unit in communication with the single static radar, wherein the controller unit comprises: one or more data storage devices configured to store instructions; one or more communication interfaces; and one or more hardware processors operatively coupled to the one or more data storage devices via the one or more communication interfaces, wherein the one or more hardware processors are configured by the instructions to: (i) acquire, a first set of radar return data from a first reflected signal and a second set of radar return data from a second reflected signal, the first reflected signal being a signal reflected off a first sample setup and the second reflected signal being a signal reflected off a second sample setup in response to a transmitted signal from the single static radar positioned at a predefined inclination from the first sample setup and the second sample setup, wherein the first sample set up comprises the mechanical rotating platform and the second sample set up comprises the object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix; (ii) perform, a non-coherent subtraction between the first set of radar return data and the second set of radar return data to obtain a resultant radar return data, wherein resultant radar return data is indicative of a background subtracted range time matrix; (iii) perform, a plurality of preprocessing steps on the resultant radar return data to obtain a processed range time matrix; (iv) apply, a range-doppler processing technique on the processed range time matrix to obtain a range-gated matrix indicative of a range time matrix constrained to an observation window; (v) create a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar; (vi) iteratively perform steps (i) through (v) to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights; and (vii) obtain, a three-dimensional reconstructed image of the object under inspection by combining the plurality of transverse plane images.

In another aspect, there is provided a processor implemented method comprising: acquiring, via one or more hardware processors, a first set of radar return data from a first reflected signal and a second set of radar return data from a second reflected signal, the first reflected signal being a signal reflected off a first sample setup and the second reflected signal being a signal reflected off a second sample setup in response to a transmitted signal from a single static radar positioned at a predefined inclination from the first sample setup and the second sample setup, wherein the first sample set up comprises a mechanical rotating platform and the second sample set up comprises an object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix; performing, via the one or more hardware processors, a non-coherent subtraction between the first set of radar return data and the second set of radar return data to obtain a resultant radar return data, wherein resultant radar return data is indicative of a background subtracted range time matrix; performing, via the one or more hardware processors, a plurality of preprocessing steps on the resultant radar return data to obtain a processed range time matrix; applying, via the one or more hardware processors, a range-doppler processing technique on the processed range time matrix to obtain a range-gated matrix indicative of a range time matrix constrained to an observation window; creating, via the one or more hardware processors, a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar; iteratively performing, via the one or more hardware processors, steps of acquiring the first set of radar return data and the second set of radar return data to creating the transverse plane image of the object under inspection to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights; and obtaining, via the one or more hardware processors, a three-dimensional reconstructed image of the object under inspection by combining the plurality of transverse plane images.

In yet another aspect, there are provided one or more non-transitory machine-readable information storage mediums comprising one or more instructions, which when executed by one or more hardware processors cause a processor implemented method for non-intrusive material quality inspection using three-dimensional monostatic radar based imaging. The method includes acquiring, a first set of radar return data from a first reflected signal and a second set of radar return data from a second reflected signal, the first reflected signal being a signal reflected off a first sample setup and the second reflected signal being a signal reflected off a second sample setup in response to a transmitted signal from a single static radar positioned at a predefined inclination from the first sample setup and the second sample setup, wherein the first sample set up comprises a mechanical rotating platform and the second sample set up comprises an object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix; performing, a non-coherent subtraction between the first set of radar return data and the second set of radar return data to obtain a resultant radar return data, wherein resultant radar return data is indicative of a background subtracted range time matrix; performing, a plurality of preprocessing steps on the resultant radar return data to obtain a processed range time matrix; applying, a range-doppler processing technique on the processed range time matrix to obtain a range-gated matrix indicative of a range time matrix constrained to an observation window; creating, a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar; iteratively performing, steps of acquiring the first set of radar return data and the second set of radar return data to creating the transverse plane image of the object under inspection to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights; and obtaining, a three-dimensional reconstructed image of the object under inspection by combining the plurality of transverse plane images.

In accordance with an embodiment of the present disclosure, the one or more hardware processors are further configured to obtain, a 3D reflection intensity map of the object under inspection by using (i) a boundary detection technique and (ii) a thresholding technique; create, a 3D heatmap view model using the 3D reflection intensity map of the object under inspection for visualization of the sample material placed inside the object under inspection; and identify, at least one of (i) a high intensity location and (ii) a location with change detection in the 3D heatmap view model to identify one or more anomalies in the sample material placed inside the object under inspection.

In accordance with an embodiment of the present disclosure, the one or more hardware processors are further configured to use the resultant set of radar return data is used to determine an initial three-dimensional reconstructed image of the object under inspection.

In accordance with an embodiment of the present disclosure, the plurality of preprocessing steps includes performing motion filtering, mean subtraction, and envelope detection on the resultant radar return data.

In accordance with an embodiment of the present disclosure, the plurality of virtual antenna positions of the single static radar is indicative of virtual motion of the single static radar around the object under investigation in a virtual circular trajectory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 is an exemplary flow diagram illustrating a method for non-intrusive material quality inspection using three-dimensional monostatic radar based imaging, according to some embodiments of the present disclosure.

DETAILED DESCRIPTION

Figure 1:
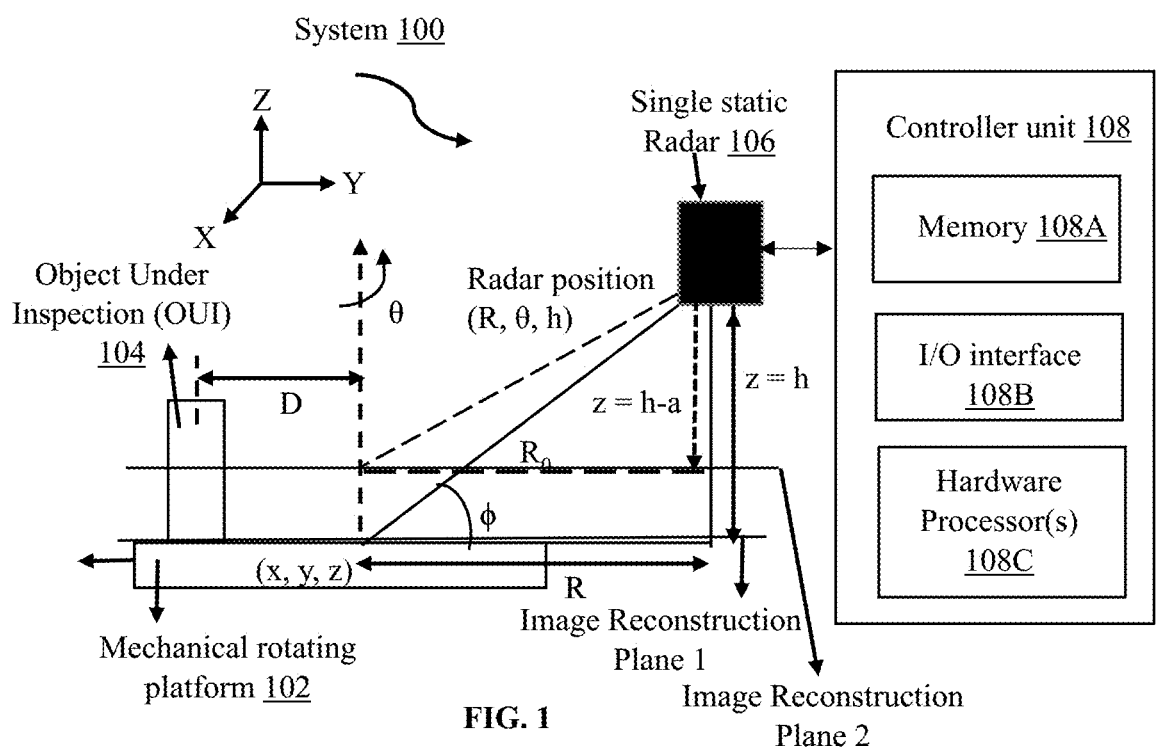
FIG. 1 illustrates an exemplary block diagram of a system for non-intrusive material quality inspection using three-dimensional monostatic radar based imaging, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Identification of concealed objects and inspection of material quality inside the concealed objects for identification of intrinsic defects is considered as an imperative challenge in industrial scenarios where an object is ought to be recognized without even opening its enclosure. Material quality inspection requires identification of intrinsic defects which are not observable from outside an object/structure's boundary. The intrinsic defects can be lumps in semi-liquid or voids in solid structures. The material quality inspection method should identify the presence and nature of the intrinsic defect. A prerequisite for occluded object detection including metallic or non-metallic and inside boxes/casings, is an ability to penetrate through layers of occlusion. In a classical consideration for detecting presence of a given object in a sealed package and material quality inspection, radar based technique utilize a large array of antennas and more than one radars. Radar based techniques mainly apply synthetic aperture radar (SAR) or inverse synthetic aperture radar (ISAR) for image formation. It is envisaged that in an ideal industrial deployment scenario, a target object will be in motion with respect to a static radar. This is akin to the Inverse Synthetic Aperture Radar (ISAR) imaging. The large array of antennas is controlled by highly complex and costly switches, rendering it practically undesirable. Thus, complexity and cost of a quality inspection system is a very important consideration.

The technical problem of focusing on industrial use case of occluded object detection, material quality inspection to identify intrinsic defects and simultaneously considering practical problems in realizing microwave imaging, is addressed in the present disclosure. The present disclosure provides an image guided object detection solution using a monostatic radar and moving object. Even though, angular (cross-range) resolution of the monostatic radar is lower compared to the MMW radars owing to their longer wavelengths, but penetrability and ability to confer geometric information about the object is better in case of the monostatic radar. The present disclosure provides a system and method for non-intrusive material quality inspection using three-dimensional monostatic radar based imaging. In other words, a motion-induced radar imaging method and system is incorporated in the present disclosure where an object under inspection (OUI) undergoes a circular translation motion on a rotating platform. Traditional, a delay and sum (DAS) algorithm is used for object detection and material quality inspection which assumes an array of antennas necessary to be formed as digital beamforming However, in the present disclosure, a single antenna (monostatic mode) is utilized to create virtual radar aperture from the motion of the OUI. Therefore, to generate an accurate image, the DAS algorithm is modified to include an array of virtual antenna positions, generated by exploiting the motion of the OUI. This modified DAS algorithm is built to estimate shape of the object and its radial and angular displacement with respect to center of the rotating platform and monostatic radar position, respectively. The radial displacement as well as the angular locations of the OUI are identified from three-dimensional reconstructed images.

In the context of the subject disclosure, definitions of certain expressions and their usage are as explained herein below.

Object under inspection refers to an object containing a sample material that is kept on the mechanical rotating platform and then investigated using the radar.

Transverse plane refers to a plane orthogonal to direction of propagation of a radar transmitted pulse on which an image is generated inside a predefined area. In the context of present disclosure, the transverse plane is a plane that is parallel to ground.

Transverse plane image refers to an image generated on the transverse plane, that shows horizontal cross-section of the object under inspection and its surroundings inside a predefined area and at a given height.

The expressions 'Transverse plane image' and 'image' may be interchangeably used.

The expressions 'single static radar' and 'radar' may be interchangeably used.

The expressions x-axis, y-axis and z-axis may be interchangeably represented as X-axis, Y-axis and Z-axis respectively.

φ and phi may be interchangeably used.

θ and theta may be interchangeably used.

Referring now to the drawings, and more particularly to FIG. 1 through FIG. 12D, where similar reference characters denote corresponding features consistently throughout the figures, there are shown preferred embodiments and these embodiments are described in the context of the following exemplary system and/or method.

FIG. 1 illustrates an exemplary block diagram of a system 100 for non-intrusive material quality inspection using three-dimensional monostatic radar based imaging, according to some embodiments of the present disclosure. In an embodiment, the system 100 comprises a mechanical rotating platform 102, an object under inspection 104 positioned on the mechanical rotating platform 102, and a single static radar 106 positioned at a predefined inclination from the object under inspection 104 and the mechanical rotating platform 102. Top portion of the mechanical rotating platform has high reflectivity. The single static radar (hereafter referred as radar throughout the description) could be but not limited an ultra-wideband frequency (UWB) radar or an impulse radar. In an embodiment, the radar could be mounted with one of (i) a single transmitter and single receiver and (ii) a single transmitter with an array of receivers. In the present disclosure, for experimentation, a PulsON™ 440 (P440) radar module is used which is an UWB radio transceiver operating between 3.1 GHz ($\lambda$=9.67 cm) and 4.8 GHz ($\lambda$=6.25 cm) in monostatic mode, with center frequency at 4.3 GHz ($\lambda$=6.97 cm). The radar module utilizes BroadSpec™ antennas having a beam pattern which is omnidirectional in azimuth. Range resolution for the radar is 9.1 mm and transmit gain is set to −31.6 dBm. The radar is positioned at a direct line-of-sight distance ($R_0$) of 24 cm between phase center of the BroadSpec™ antennas and the center of the mechanical rotating platform 102, with an inclination angle $\phi$=45°. In other words, as shown in FIG. 1, the radar looks towards the mechanical rotating platform 102 from a fixed height h. Horizontal distance of the radar from the mechanical rotating platform 102 is given by $R=R_0 \cdot \cos(\phi)$ and the height of the radar is given by $h=R_0 \cdot \sin(\phi)$. Further, angular direction of rotation of the mechanical rotating platform is denoted by $\theta$. These parameters are used to reconstruct an image of the object under inspection which is a horizontal cross-section of an observation window. The mechanical rotating platform rotates at a speed of 7.5 rpm and radius of the mechanical rotating platform is 10 cm. The OUI is placed on the mechanical rotating platform with an offset (D) to the center and thus, it undergoes a circular translation motion on the mechanical rotating platform, unlike a typical ISAR scenario where an object rotates on its own axis. Here, the OUI consists of 73 solid, metallic ball bearings of 1 cm diameter densely packed in a cylindrical plastic container of diameter 3.5 cm and height 11.3 cm. In an embodiment, the radar module can integrate multiple scans coherently to improve Signal-to-Noise Ratio (SNR), which increases by 3 dB every time the integration is doubled. A Pulse Integration Index (PII), which indicates number of times the integration is doubled, is set to a maximum allowable value of 15 which gives us a SNR improvement of 45 dB. Further, data collection is restricted to a smallest permissible observation range of 0.88 m. For the above PII and observation range, minimum lossless scan interval is 29 milliseconds (i.e., 34.4 Hz sampling rate). As the mechanical rotating platform 102 has a rotation per minute (rpm) of 7.5, it completes 1 rotation in 8 seconds. Thus, number of scans required to cover 1 full rotation is provided by 8/0.029 which is equal to 276. Correspondingly, angular sampling is provided as 360°/276 which is equal to 1.3°.

The system 100 further comprises a controller unit 108 that is in communication with the single static radar 106. In an embodiment, the controller unit 108 comprises one or more data storage devices or memory 108A configured to store instructions; one or more communication interfaces 108B; and one or more hardware processors 108C operatively coupled to the one or more data storage devices 108A via the one or more communication interfaces 108B.

The one or more hardware processors 108C can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the one or more hardware processors 108C can be implemented in a variety of computing systems, such as laptop computers, notebooks, hand-held devices, workstations, mainframe computers, servers, a network cloud and the like.

In an embodiment, the communication interface(s) or input/output (I/O) interface(s) 108B may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The one or more data storage devices or memory 108A may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

FIG. 2 is an exemplary flow diagram illustrating a method 200 for non-intrusive material quality inspection using three-dimensional monostatic radar based imaging, according to some embodiments of the present disclosure. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 3:
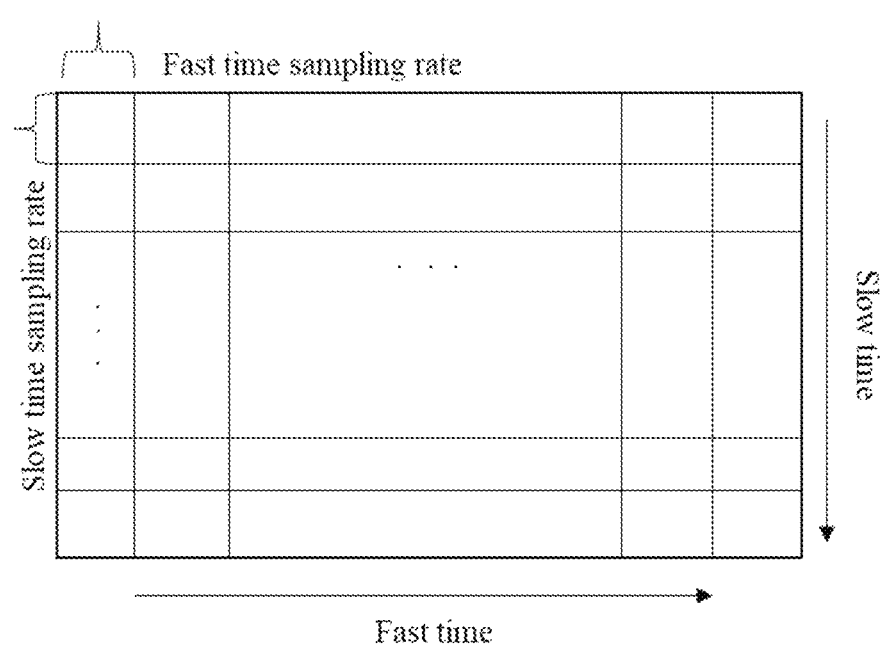
FIG. 3 provides a pictorial representation of the radar return data in the form of the range time matrix according to some embodiments of the present disclosure.

In accordance with an embodiment of the present disclosure, at step 202 of FIG. 2, the one or more hardware processors 108C are configured to acquire, a first set of radar return data from a first reflected signal and a second set of radar return data from a second reflected signal. The first reflected signal is a signal reflected off a first sample setup and the second reflected signal is a signal reflected off a second sample setup in response to a transmitted signal from the single static radar. The single static radar is positioned at a predefined inclination from the first sample setup and the second sample setup. In an embodiment, the first sample set up comprises the mechanical rotating platform and the second sample set up comprises the object under inspection positioned on the mechanical rotating platform with an offset to center thereof and undergoing a circular translation motion during each rotation of the mechanical rotating platform. In accordance with the present disclosure, a sample material is placed inside the object under inspection. In an embodiment, the sample material could be a solid material, a semisolid material and a liquid material. In an embodiment, the acquired radar return data is in form a range time matrix. The range time matrix of dimensions m×n, represents m scans of length n. FIG. 3 provides a pictorial representation of the radar return data in the form of the range time matrix according to some embodiments of the present disclosure. As can be seen in FIG. 3, every single row vector of the range time matrix forms a fast time axis, while column vectors form a slow-time axis. It is depicted from FIG. 3 that a fast time sampling occurs at 61 picoseconds (i.e., 16.39 GHz sampling rate denoted by $F_s$).

In accordance with an embodiment of the present disclosure, at step 204 of FIG. 2, the one or more hardware processors 108C are configured to perform a non-coherent subtraction between the first set of radar return data and the second set of radar return data to obtain a resultant radar return data. In an embodiment, the non-coherent subtraction refers to subtract square of amplitude of first set of radar return data (indicative of background data) from the square of amplitude of the second set of radar return data (indicative of target object data) and then taking a square root. In an embodiment, prior to performing non-coherent subtraction, the first set of radar return data and the second set of radar return data are filtered using a 3rd order Infinite Impulse Response (IIR) bandpass filter covering a frequency range of 3.1-4.8 GHz. In an embodiment, the resultant radar return data is indicative of a background subtracted range time matrix which is used to determine an initial three-dimensional reconstructed image of the object under inspection.

Further, at step 206 of FIG. 2, the one or more hardware processors 108C are configured to perform a plurality of preprocessing steps on the resultant radar return data to obtain a processed range time matrix. In an embodiment, the plurality of preprocessing steps includes performing motion filtering, mean subtraction, and envelope detection on the resultant radar return data. The resultant radar return data is first motion-filtered using a 4-Tap difference filter to obtain a motion filtered data M, provided by equation (1) below:

$$y(n)=x(n)-0.6 \times x(n-1)-0.3 \times x(n-2)-0.1 \times x(n-3) \quad (1)$$

Equation (1) governs functioning of a motion filter. Each row of resultant radar return data matrix is given by x which are provided as input to the motion filter. Each row of the motion filtered data matrix M is indicated by y, which indicates output of the motion filter equation. So, $n^{th}$ row of M gets its values form the $n^{th}$, $n-1^{th}$, $n-2^{th}$ and $n-3^{th}$ row of the resultant radar return data matrix where each of the input rows are multiplied by their corresponding coefficients as given in the equation (1). The motion-filtered data M is first averaged for each range bin to obtain an array $M_{avg}$, of size 1×n. Then, the average signal is subtracted from each scan of M to obtain a signal matrix P. Lastly a low-pass filter ($6^{th}$ order IIR) is applied on P to obtain its envelop. Final dataset obtained after low pass filtering is the processed range time matrix denoted as $M_1$ which is a m×n matrix where m denotes total number of scans and n denotes total number of range bins from where the reflected signals are captured. The low pass filters used in the present disclosure are known in the art standard filters where filter coefficients are configured for PulsON 440 (P440) UWB radar module In accordance with an embodiment of the present disclosure, at step 208 of FIG. 2, the one or more hardware processors 108C are configured to apply a range-doppler processing technique on the processed range time matrix to obtain a range-gated matrix indicative of a range time matrix constrained to an observation window.

In an embodiment, the step 208 is better understood by way of the following exemplary explanation.

In an embodiment, a range-doppler data is determined from the processed range time matrix $M_1$ by computing N-point FFT of the slow-time scans for each range bin where N is nearest power of 2 greater than m, and then plotting a resulting range-frequency 2D matrix. This is used as a data quality check. For a given $R_0$, the observation window of interest becomes fixed since diameter of the mechanical rotating platform is known. As $R_0$ is reference distance from the center of the mechanical rotating platform 102, the observation window size (in range) becomes symmetric with respect to $R_0$. Suppose the observation window is of size $n_1$. Then an operating data matrix of size m×n known as the range-gated matrix and denoted by $M_2$ is obtained where any cell outside the observation window is set to 0. This range-gated matrix is used to generate intensity values to form an image. In an embodiment, two test scenarios are considered wherein in the first scenario considers center of OUI placed at 4 cm and 7.8 cm radial distance, respectively, from the center of the mechanical rotating platform, and in the second scenario the starting angular locations of OUI on the mechanical rotating platform are considered to be fixed at angles of 0°, 90°, 180° and 270° with respect to the radar line-of-sight. Here, position closest to the radar location is marked as 0°. In an embodiment, for a given $R_0$ and φ, the observation window gets fixed. For instance, when $R_0$ is 24 cm and φ is 45°, the maximum range requirement gets limited to 32 cm which is the furthest edge of the mechanical rotating platform. Therefore, an accurate image is formed if the observation window is considered only.

Figure 4A:
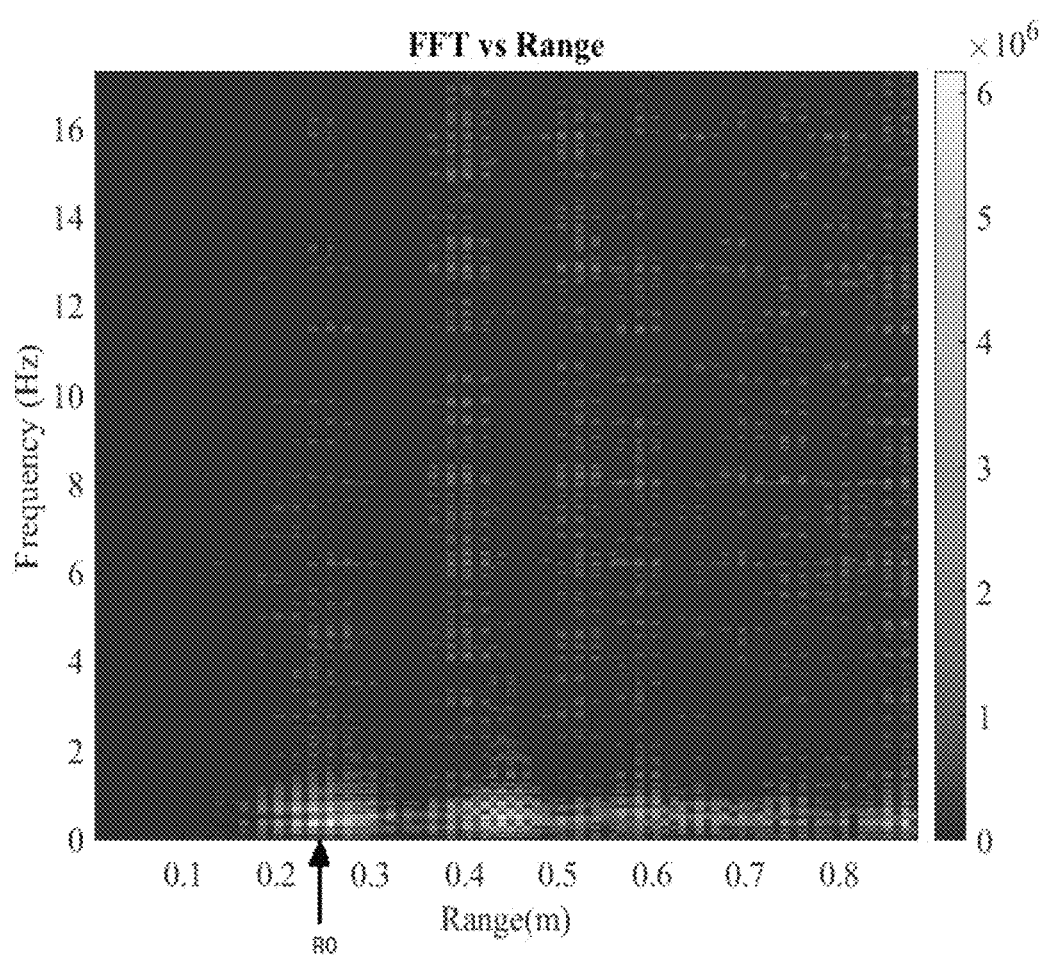
FIGS. 4A and 4B show graphical representation of experimental results of the range doppler processing technique when the OUI is radially displaced from center of the mechanical rotating platform by 4 cm and 7.8 cm, respectively, according to some embodiments of the present disclosure.
Figure 4B:
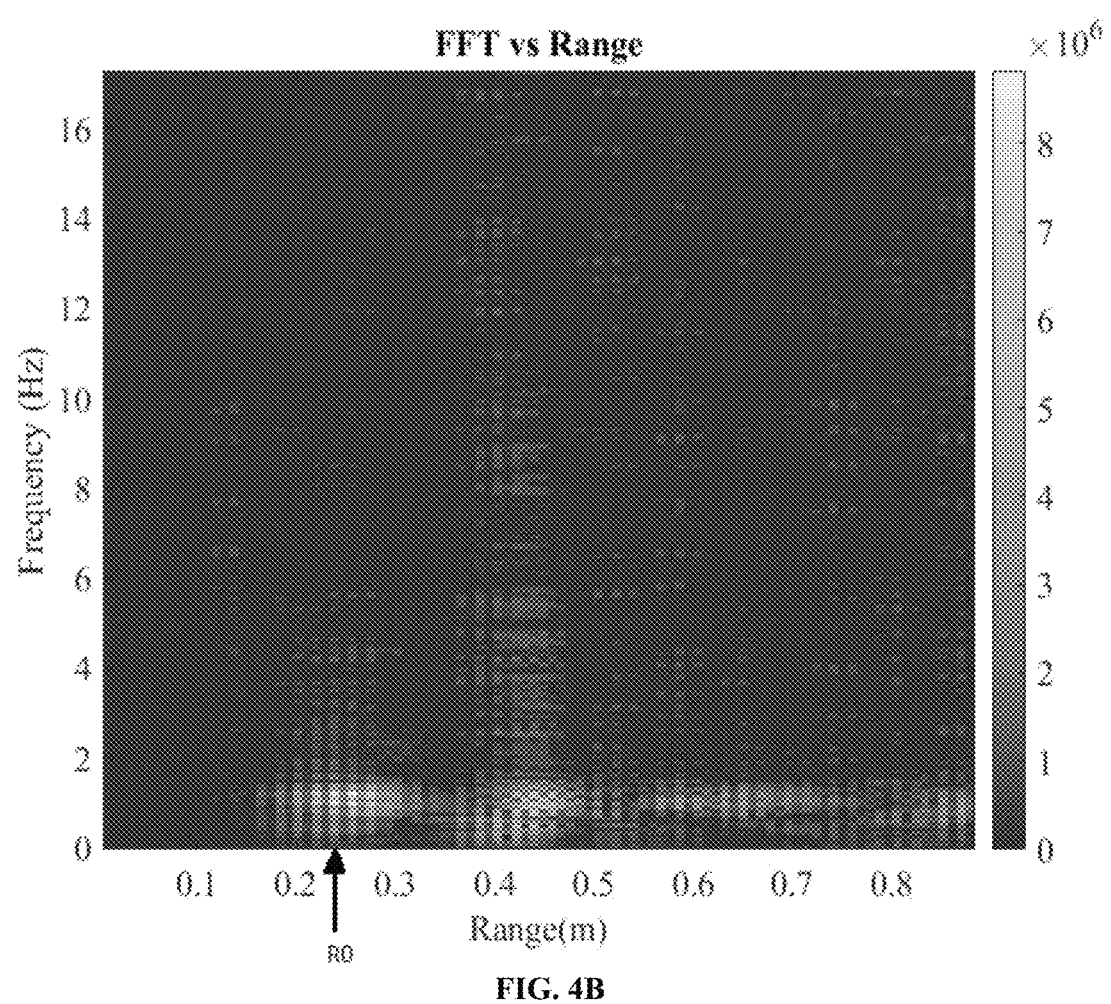
Figure 5A:
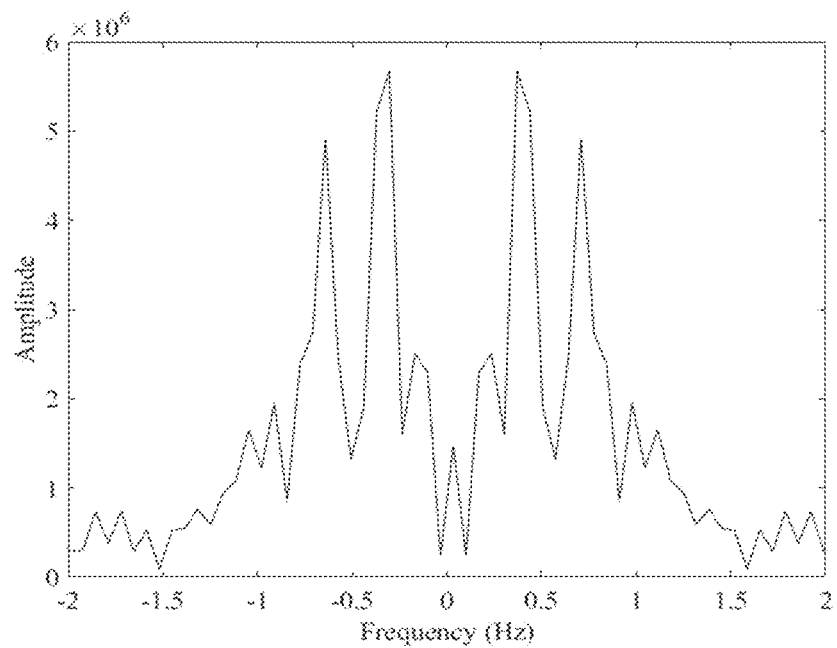
FIGS. 5A and 5B show a graphical representation of doppler frequency components corresponding to two radial displacements in a relevant frequency range for a given $R_0$ according to some embodiments of the present disclosure.
Figure 5B:
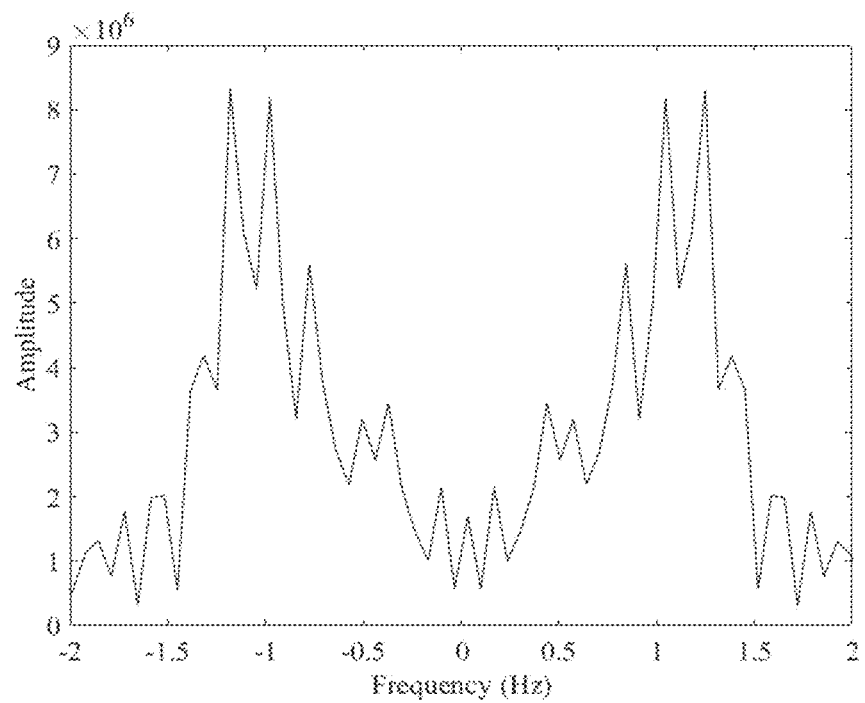

FIGS. 4A and 4B show graphical representation of experimental results of the range doppler processing technique when the OUI is radially displaced from center of the mechanical rotating platform 102 by 4 cm and 7.8 cm, respectively according to some embodiments of the present disclosure. Here, extent of observation range around $R_0$ is determined by observing dominant Doppler frequency components. FIGS. 4A and 4B display a symmetry around $R_0$. In an embodiment, a repeating doppler pattern at higher ranges is observed due to a multipath effect. The multipath effect is observed where secondary paths lead to similar frequency signatures getting repeated at higher range bins. In an embodiment, multipath segregation is possible because of high range resolution of an UWB impulse radar corresponding to 9.1 mm. Dimensions of the OUI is comparable to wavelength and it shows a specific doppler signature while in motion. FIGS. 5A and 5B show a graphical representation of doppler frequency components corresponding to two radial displacements in a relevant frequency range for the given $R_0$ according to some embodiments of the present disclosure. Radial displacement is 4 cm in FIG. 5A and 7.8 cm in FIG. 5B.

In accordance with an embodiment of the present disclosure, at step 210 of FIG. 2, the one or more hardware processors 108C are configured to create a transverse plane image of the object under inspection at a predefined height of the single static radar by applying a modified Delay-and-Sum (m-DAS) algorithm on the range-gated range-time matrix. Traditionally, DAS algorithm is employed for cases where the object is kept stationary and the radar is placed on a moving platform. In the present disclosure, the object is kept on a rotating platform and radar is kept stationary. Thus, the modified Delay-and-Sum algorithm determines a plurality of virtual antenna positions of the single static radar around the object under inspection and a distance of each pixel of the transverse plane image from each of the plurality of virtual antenna positions of the single static radar. The plurality of virtual antenna positions of the single static radar is indicative of virtual motion of the single static radar around the object under investigation in a virtual circular trajectory. In accordance with an embodiment of the present disclosure, at step 210 of FIG. 2, the one or more hardware processors 108C are configured to iteratively perform steps of acquiring the first set of radar return data and the second set of radar return data to creating the transverse plane image of the object under inspection to obtain a plurality of transverse plane images of the object under inspection at a plurality of virtual heights of the single static radar. In an embodiment, the plurality of virtual heights of the single static radar is indicative of a plurality of transverse cross sections of object under inspection at a plurality of heights. Further, at step 214 of FIG. 2, the one or more hardware processors 108C are configured to obtain a three-dimensional reconstructed image of the object under inspection by combining the plurality of transverse plane images.

The steps 210 through 214 are better understood by way of following exemplary explanation.

Figure 6A:
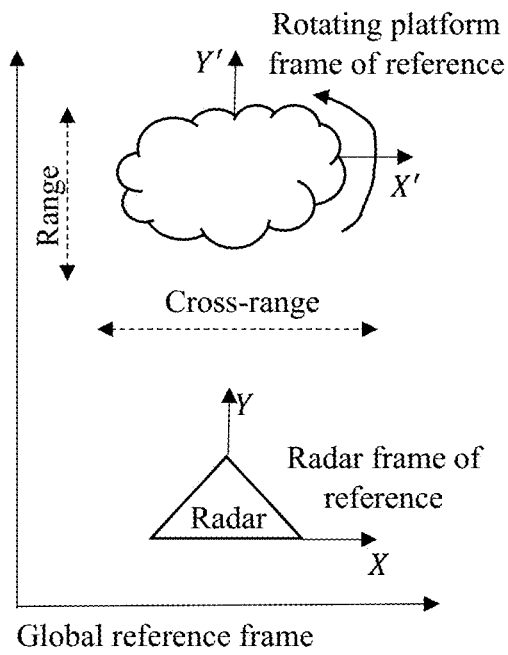
FIGS. 6A and 6B provides a pictorial representation illustrating two reference frames according to some embodiments of the present disclosure.
Figure 6B:
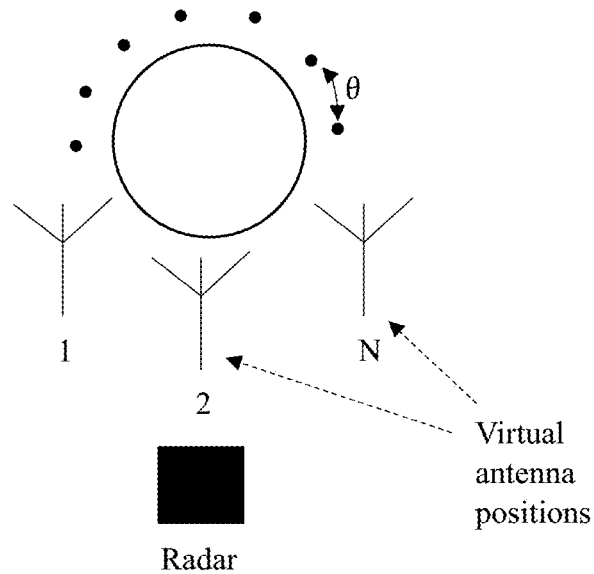

In an embodiment, two reference frames are considered. FIGS. 6A and 6B provides a pictorial representation illustrating the two reference frames according to some embodiments of the present disclosure.

Case 1: Radar frame of reference (radar as origin).
Case 2: Rotating platform frame of reference (Centre of rotating platform as origin)

Origin translation from case 1 to case 2 effectively means that the radar is rotating around the OUI in the virtual circular trajectory. Hence, the plurality of virtual antenna positions is created by rotating the mechanical rotating platform with the OUI. This is valid under that assumption that, for small rotational angles of the OUI, the reflected signals from the same reflector for different echoes are centered at the same range bin. Conventional DAS techniques involve time-shifting and summing up the reflected signals from different antenna angles to construct a transverse plane view of the object. After shifting coordinate system to target frame of reference (body fixed frame), the modified delay and sum algorithm is applied for image creation in the transverse plane of the target. The transverse plane is divided into a grid of needed resolution in a cross-range and range directions, with each grid point being called a pixel. Reflections from boundaries are added coherently at the pixels for cross range and range directions. By repetitive summation, noise clutter from the environment is removed and actual reflections get robustly summed up.

For applying the m-DAS algorithm, an arbitrary area of 80 cm×80 cm is considered. The area is divided into a grid of 201×201 pixels in the transverse plane. Further, different cross-sectional views in the transverse plane of the OUI are considered that arises from considering the height of the OUI. As shown in FIG. 1, the virtual height of the radar is given by z, where 0<z<h. From the target frame of reference, the transmitter-receiver ($T_x$-$R_x$) antenna pair of the radar seems virtually rotating around the object under inspection with each angular position denoted as θ, where θ varies from 0° to 360°, with angular resolution 1.3°. Each scan in $M_2$ corresponds to a respective virtual antenna position, for a total of m values of θ, forming an Θ array of length m. Each projection of the virtual antenna position on the transverse plane is denoted by (X, Y). The $k^{th}$ position of virtual antenna for different values of k (k=1, 2, ... m) is described by equation 2 below:

$$\begin{cases} X(k) = R\cos(\Theta(k)) \\ Y(k) = R\sin(\Theta(k)) \end{cases}, \text{for } k = 1, 2, \ldots m. \quad (2)$$

For each pixel point denoted by ($x_i$, $y_j$, z), where i, j=1, 2, ... 201, and 0<z<h, total intensity is computed using m-DAS algorithm to obtain a final intensity matrix denoted by I ($x_i$, $y_j$, z), at coordinates $x_i$, $y_j$ and z. Round-trip distance of each pixel ($x_i$, $y_j$, z) from the $k^{th}$ virtual antenna position is stored in an array d(k), where d(k) is provided in equation (3) below:

$$d(k) = 2\sqrt{(X(k)-x_i)^2 + (Y(k)-y_j)^2 z^2} \quad (3)$$

Figure 7:
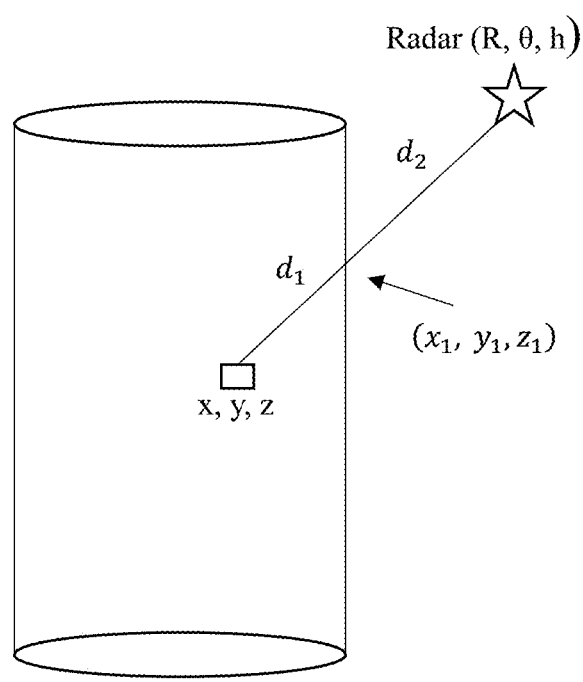
FIG. 7 illustrates an example for determining a modified value of the round-trip distance of each pixel of the transverse plane image of the OUI, according to some embodiments of the present disclosure.

In the m-DAS algorithm described in the present disclosure, d(k) is modified considering different permittivities of medium of the sample material placed inside the OUI and outside the OUI. FIG. 7 illustrates an example for determining a modified value of the round-trip distance of each pixel of the transverse plane image of the OUI, according to some embodiments of the present disclosure. As shown in FIG. 7, coordinate of intersection point of line denoted by joining the pixel ($x_i$, $y_j$, z) and radar position (R, θ, h) is computed. The coordinate of intersection point is denoted by ($x_1$, $y_1$, $z_1$). Further, due to different permittivities of the mediums inside and outside the OUI, the round trip distance is determined as sum of distance of each pixel from the intersection point and distance of radar position (R, θ, h) from the intersection point. As shown in FIG. 7, $d_1$ denotes distance of ($x_i$, $y_j$, z) from ($x_1$, $y_1$, $z_1$) and $d_2$ denotes distance of ($x_1$, $y_1$, $z_1$) from (R, θ, h) and d(k)=$d_1$(k)+$d_2$(k). For each scan (i.e. different virtual antenna position), the split of d(k) is done in accordance with permittivity of the medium which is denoted by eps. The entire process of modifying d(k) can be further better understood by way of following pseudo code provided as example:

```
for (k = 1, k ≤ m, k = k + 1)

elevationangle = tan⁻¹( |z − h| / √((x_i − Rcos(θ))² + (y_j − Rsin(θ))²) ) % in degrees
        if (elevationangle ≤ 10) {
            if (d₁(k)/d(k)) < 0.1) {
                d'(k) = d₁(k) + d₂(k);}
            else if (d₁(k)/d(k)) ≥ 0.1 && (d₁(k)/d(k)) < 0.25) {
                d'(k) = 0.5.d₁(k).sqrt(eps) + 0.5.d₁(k) + d₂(k);}
            else (d₁(k)/d(k)) ≥ 0.25 && (d₁(k)/d(k)) < 0.5) {
                d'(k) = d₁(k).sqrt(eps);}
        }
}
```

Here, final distance is provided by d(k).

In an embodiment, since the OUI is rotating, maximum reflection from different range bins for different scans is obtained. So, location of a peak intensity in any scan is an indication of location of the OUI and hence distance from the radar. This forms a key step in imaging the OUI in the transverse plane. Relative distance of ($x_i$, $y_j$) from the radar changes from scan to scan. This leads to a change in reflection intensity for the same reflector in successive scans. In an embodiment, the range bin is defined by location of peak intensity for each scan as the "scan priority" (SP), which forms an array of length m, obtained using equation (4) provided below:

$$SP(k) = L(k) - \text{offset} \quad (4)$$

where, L(k) represents location of the peak intensity in $k^{th}$ scan and offset represents first few range bins (in all scans) which is neglected from the m-DAS algorithm processing due to excess noise (here, offset=10). SP is used for synthetic focusing of scans. Each scan is subsequently multiplied by its corresponding SP to get a matrix $M_3$. This leads to synthetic focusing and adaptive intensity change of the scans where the object under inspection is at higher distances, since they get multiplied by a higher value of SP. In order to obtain relevant intensity values from the $k^{th}$ scan, index of range bin is computed. This index of range bin denoted by b(k), is computed using equation (5) provided below:

$$b(k) = \frac{d(k) \cdot F_s}{c} \quad (5)$$

where $F_s$ represents fast-time sampling frequency=16.39 GHz and c represents speed of light=$3 \times 10^8$ m/s. Further, for non-integer b(k), contribution for a pixel $(x_i, y_j)$ from the $k^{th}$ scan is computed by interpolating linearly from the intensities of two nearest range bins. Towards that, w(k) and ind(k) for each scan are computed using equations (6) and (7) provided below:

$$w(k) = (b(k)) - \lfloor b(k) \rfloor \quad (6)$$

where $0 \leq w(k) < 1$.

$$ind(k) = \min\{\lfloor b(k) \rfloor, n\} \quad (7)$$

This is done to get the position of the range bin which is nearest to a pixel at distance d. According to exact distance and elevation of the pixel in consideration, w(k) is further modified.

The process of further modifying w(k) can be further better understood by way of following pseudo code provided as example:

---

START a(k) = 1 for all k;
for (k = 1, k ≤ m, k = k + 1) {

$$elevationangle = \tan^{-1}\left(\frac{|z-h|}{\sqrt{(x_i - R\cos(\theta))^2 + (y_j - R\sin(\theta))^2}}\right) \%$$

in degrees
if (elevationangle ≤ 10) {
  a(k) = 0;
}
else {
  a(k) = 1/max(d',TH); % TH = 0.2 to 0.3 m, threshold obtained heuristically
  ang = θ(k) − $\tan^{-1}$(y/x);
  if (|ang| < 45) {
    view = 1;}
  else if (|ang| > 45) {
    view = 0.5;}
  else (|ang| > 100) {
    view = 0.1;}
  a(k) = a(k).view;
  }
}

---

The values of w(k) and a(k) are used as final weights in calculating a resultant intensity at the pixel $(x_i, y_j, z)$. Contribution to the resultant intensity of the pixel $(x_i, y_j, z)$ from the $k^{th}$ scan is calculated as provided in equation (8) below:

$$pc(k) = M_3(k, ind(k)) \cdot (1 - w(k)) + M_3(k, \min(ind(k)+1, n)) \cdot w(k) \quad (8)$$

Then, the total intensity at this particular pixel is provided in equation (9) below:

$$I(x_i, y_j) = \Sigma_{k=1}^{m} pc(k) \cdot a(k) \quad (9)$$

The entire algorithm, from Eqns. 2 to 9, is calculated for all the other pixels to obtain a three-dimensional (3D) reconstructed image of the object under inspection.

In another embodiment, as shown in FIG. 1, downwards vertical distance from the radar 106 is 'z', where value of z lies between minimum 0 at the radar position and maximum 'h' at the surface of the rotating platform. Now, a transverse image is initially created at the height of z=h from the radar, (i.e., the image reconstruction plane 1) located on surface of the mechanical rotating platform 102 which forms a horizontal cross-section of the radar's area of investigation at that height, and this is imaged through the modified delay-and-sum algorithm where the value of z=h is put in the equation 3 (pixel distance calculation) and subsequent steps are performed. Further, the horizontal cross-section at the image reconstruction plane 2, given at any other value of z, (say z=h−a (0<a<h)) as in shown in FIG. 1 is considered, and this transverse plane is subsequently imaged. This height change occurs computationally in the modified delay-and-sum algorithm only, and not by changing the actual height of the radar. Finally, after several iterations, a plurality of transverse plane images is formed, which are subsequently combined to form the 3D reconstructed image.

Figure 8:
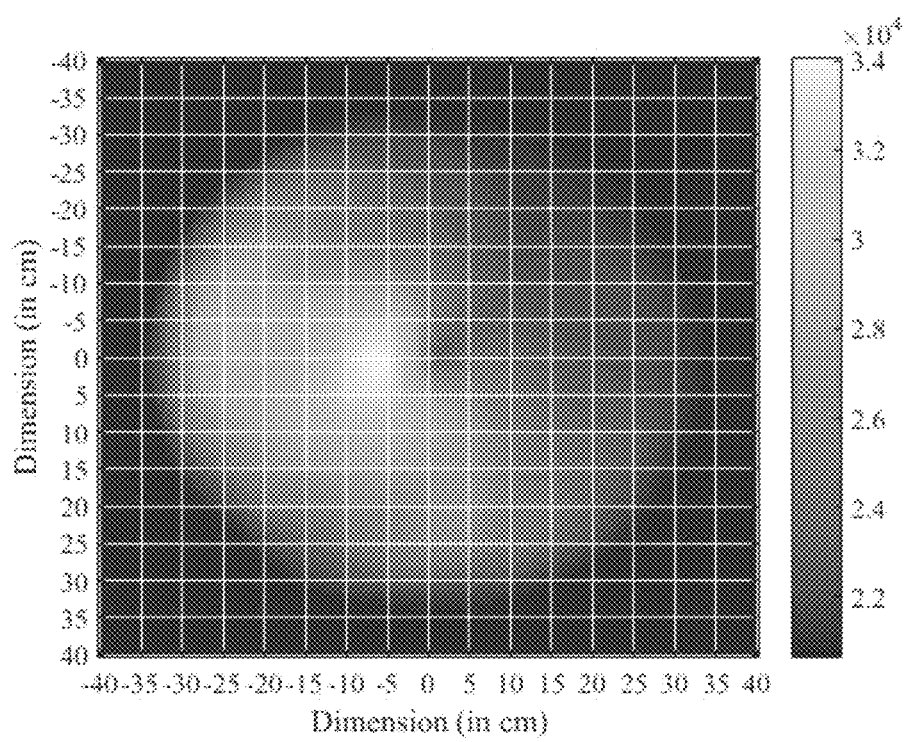
FIG. 8 provides a plot of the 3D reflection intensity map of the object under inspection, according to some embodiments of the present disclosure.
Figure 9:
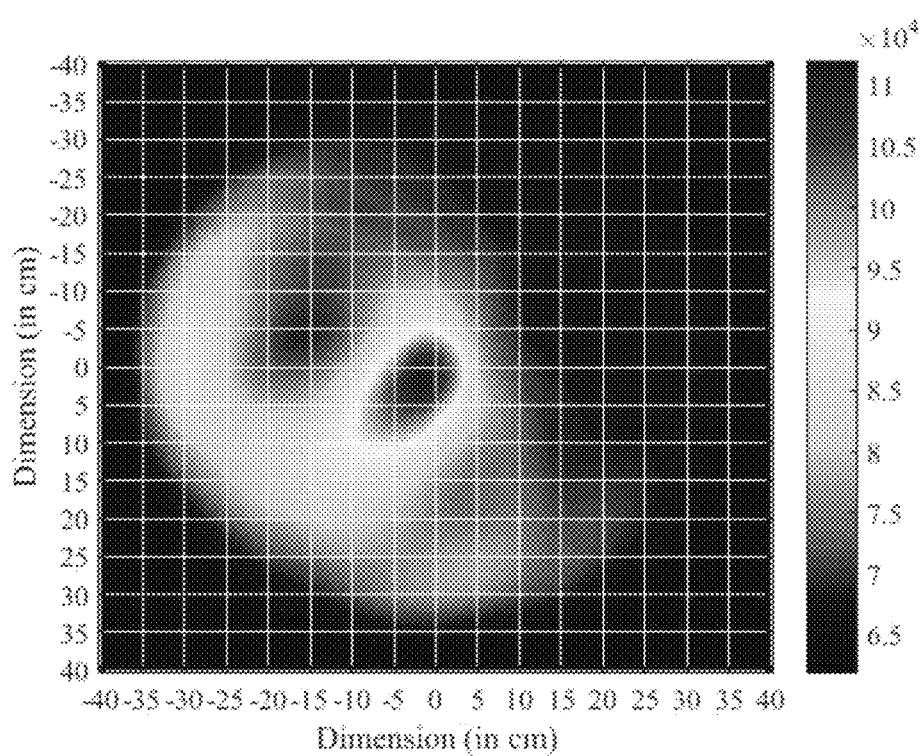
FIG. 9 provides a plot of the 3D heatmap view model of the object under inspection, according to some embodiments of the present disclosure.

In an embodiment, the one or more hardware processors 108C are further configured to a 3D reflection intensity map of the object under inspection by using (i) a boundary detection technique and (ii) a thresholding technique. It must be appreciated that the boundary detection technique and the thresholding technique are known in the art. FIG. 8 provides a plot of the 3D reflection intensity map of the object under inspection, according to some embodiments of the present disclosure. In an embodiment, the 3D reconstructed image contains contributions from all scans and is cluttered with noise components. So, a thresholding technique is applied on the 3D reconstructed image to sharpen image quality, whereby any pixel intensity values that are equal to or below a predefined threshold is set equal to 0. The values above the predefined threshold are left as they are. In an embodiment, the predefined threshold value is configurable and depends on number and position(s) of the reflectors or scatterers. In the context of present disclosure, the value of the predefined threshold is assumed to be 99.5th quantile value of intensity distribution. Upon applying thresholding technique, a final thresholded image I is obtained. In other words, once an initial estimate of reflection intensity is obtained (i.e., an initial 3D view), using the thresholding technique and the boundary detection technique, a shape of the OUI is formed. For example, in the present discourse, a cylindrical shape is formed which indicates a container shape. Further, the 3D reflection intensity map, which consists of a positive real number for each coordinate point is obtained. Furthermore, the one or more hardware processors 108C are configured to create a 3D heatmap view model using the 3D reflection intensity map of the object under inspection for visualization of the sample material placed inside the object under inspection. FIG. 9 provides a plot of the 3D heatmap view model of the object under inspection, according to some embodiments of the present disclosure. Once the 3D heatmap view model is created, the one or more hardware processors 108C are configured to identify at least one of (i) a high intensity location and (ii) a location with change detection in the 3D heatmap view model to identify one or more anomalies in the sample material placed inside the object under inspection. In other words, a location where high intensity is observed or a change is detected for the sample material placed inside the object under inspection (compared to a known homogeneous sample), is scanned specifically by adjusting R. Further, a detailed image is formed for the identified location part of the sample material and change is tracked. If such consecutive changes are detected for than three times, an alert is raised for further investigation in a cloud-based system. All of the processed data is stored in cloud, where scan is tagged to the position of radar with respect to the sample material placed inside object under inspection. Also, since there are many samples on which the tests are performed, average deviation study is conducted to detect anomaly (alternatively referred as intrinsic defects) in the 3D reconstructed images.

Experimental Results

Figure 10A:
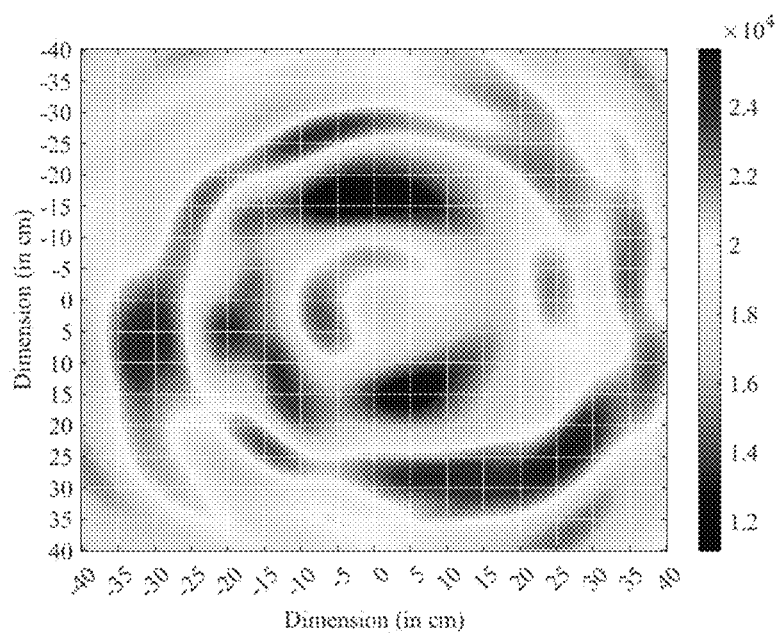
FIGS. 10A, 10B, 10C, and 10D illustrate simulation results of m-DAS algorithm with and without range gating when OUI is radially displaced from the center of the mechanical rotating platform, according to some embodiments of the present disclosure.
Figure 10B:
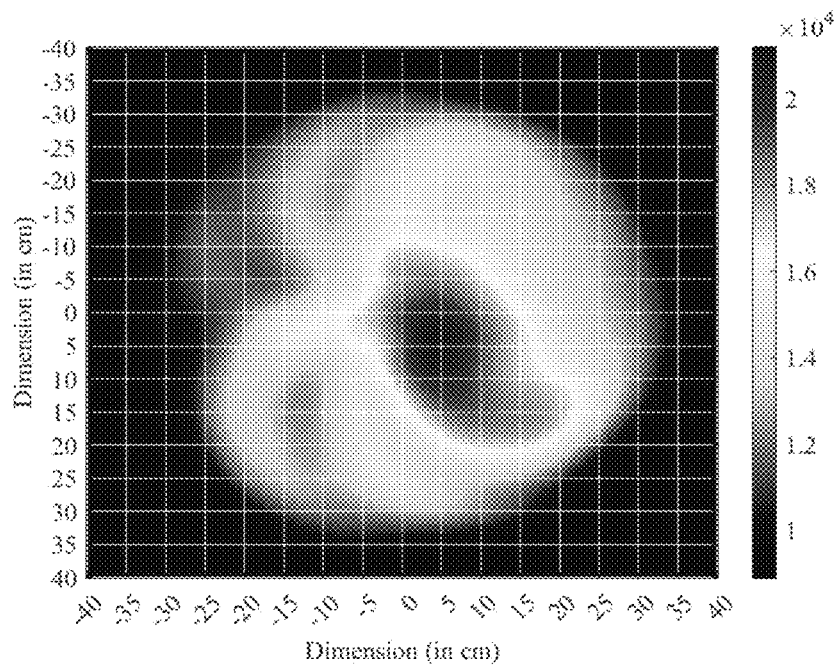
Figure 10C:
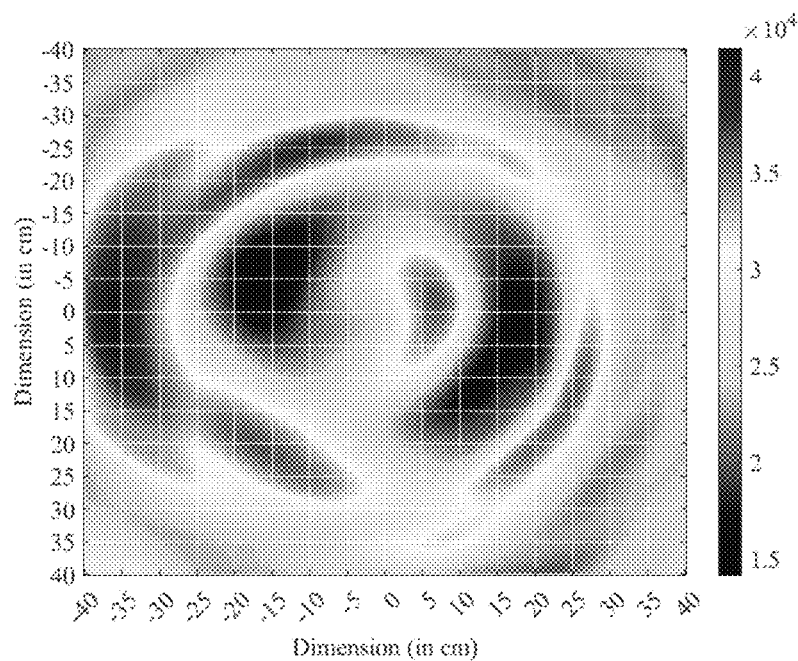
Figure 10D:
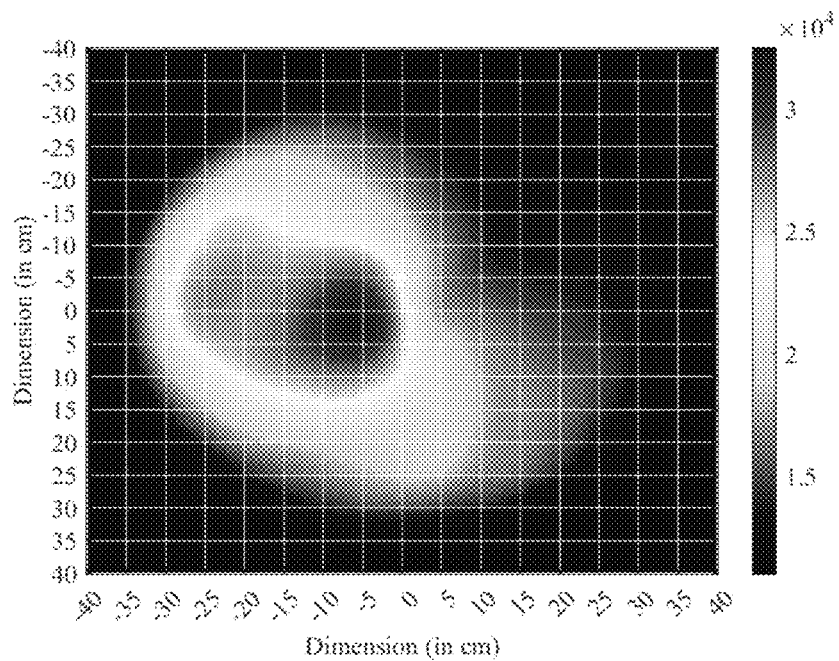

The reflected signals from various positions of the object under test which is a ball bearing cylinder in the present disclosure are depicted on transverse range-cross range plane. FIGS. 10A through 10D illustrate simulation results of m-DAS algorithm without and without range gating when OUI is radially displaced from the center of the mechanical rotating platform, according to some embodiments of the present disclosure. FIGS. 10A and 10B illustrate simulation results of m-DAS algorithm without and without range gating when OUI is radially displaced from the center of the mechanical rotating platform at a distance of 4 cm. FIGS. 8C and 8D illustrate simulation results of m-DAS algorithm without and without range gating when OUI is radially displaced from the center of the mechanical rotating platform at a distance of 7.8 cm.

Figure 11A:
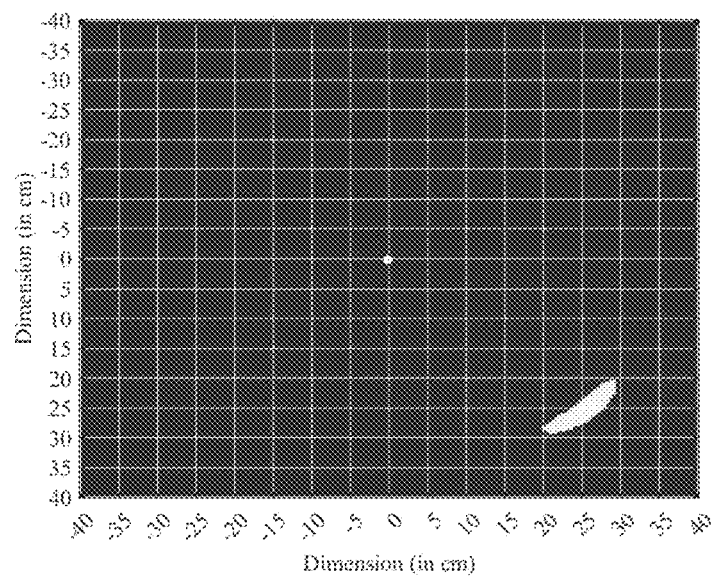
FIGS. 11A, 11B, 11C, and 11D illustrate simulation results of m-DAS algorithm with and without respective thresholded images when OUI is radially displaced from the center of the mechanical rotating platform, according to some embodiments of the present disclosure.
Figure 11B:
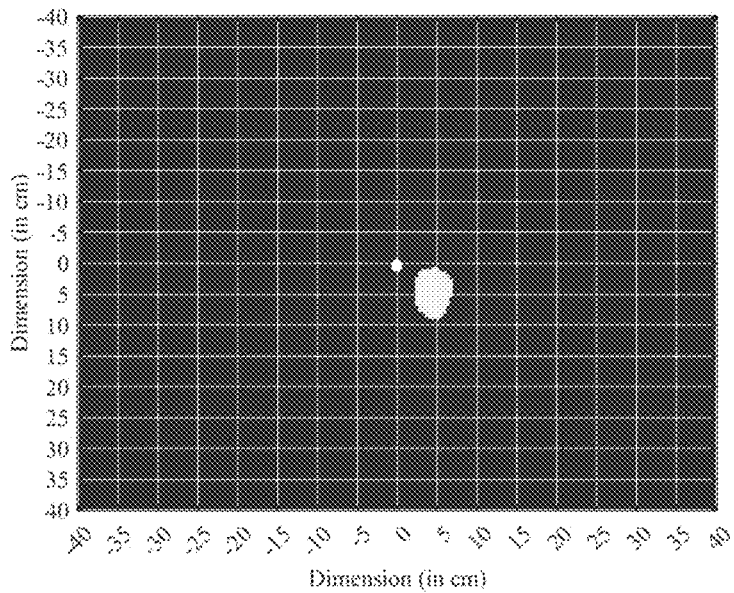
Figure 11C:
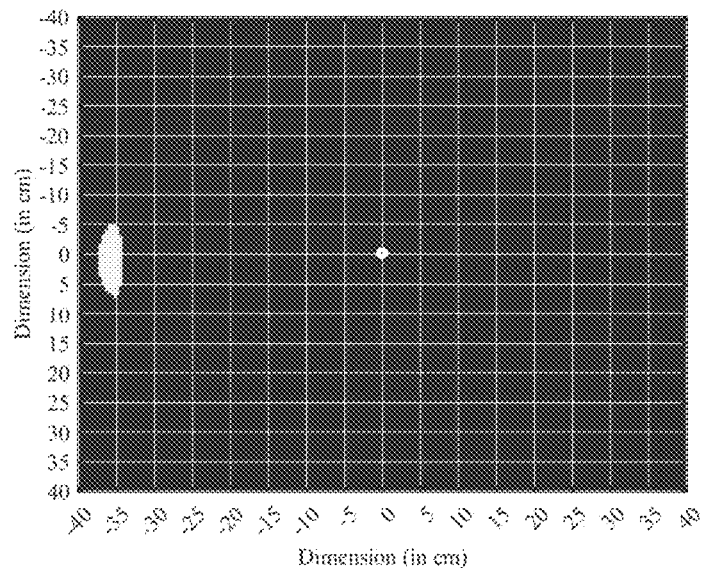
Figure 11D:
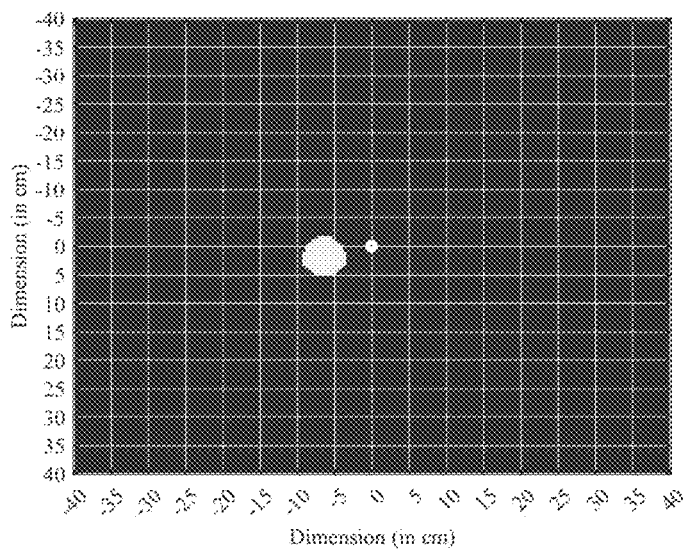
Figure 12A:
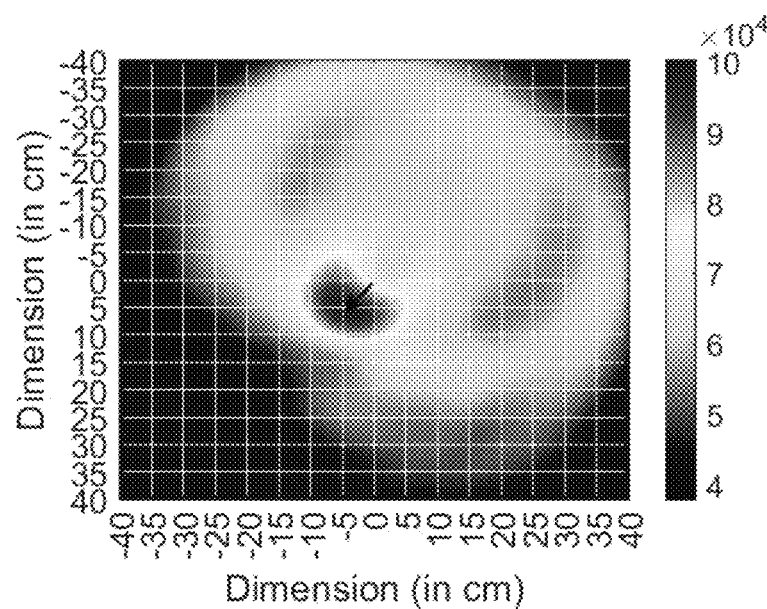
FIGS. 12A, 12B, 12C, and 12D show simulation results for the case where the starting angular locations of the object under inspection are kept at 0°, 90°, 180° and 270°, respectively, according to some embodiments of the present disclosure.
Figure 12B:
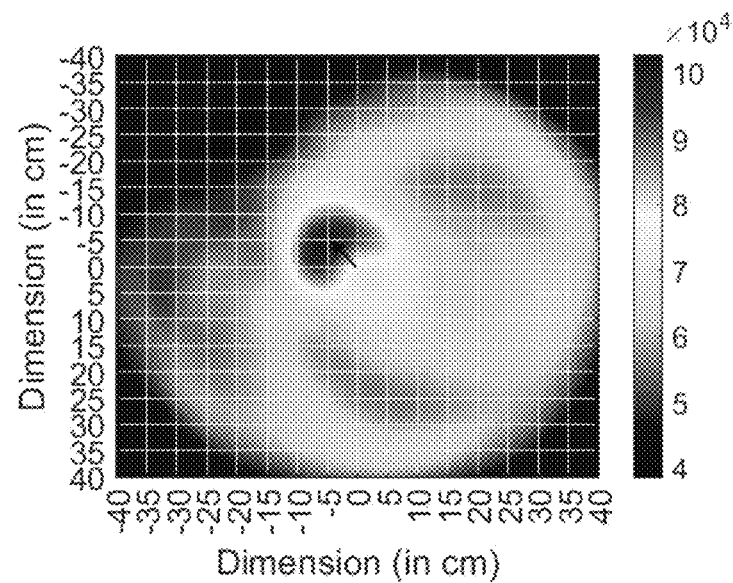
Figure 12C:
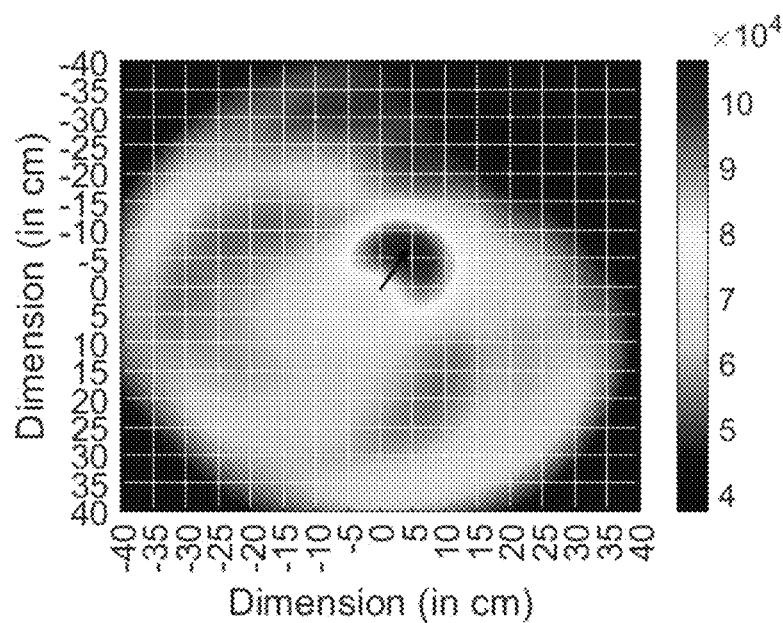
Figure 12D:
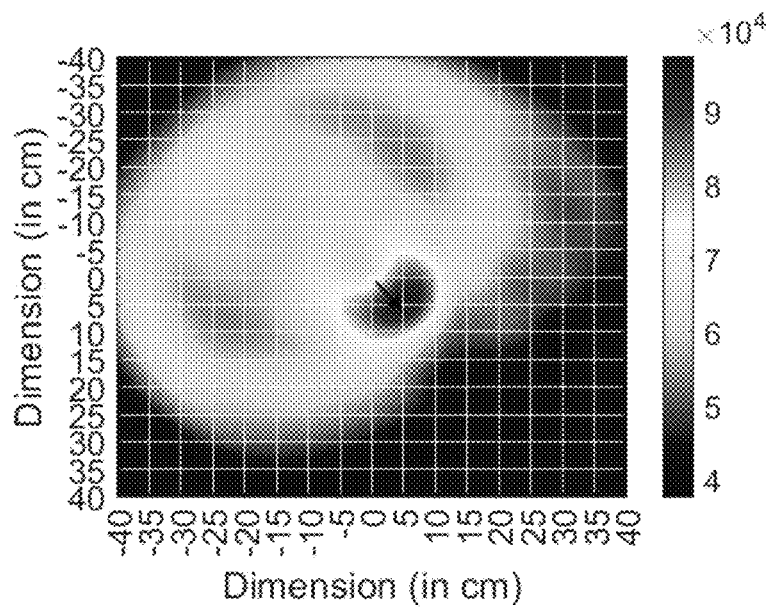

FIGS. 11A through 11D illustrate simulation results of m-DAS algorithm with and without respective thresholded images when OUI is radially displaced from the center of the mechanical rotating platform, according to some embodiments of the present disclosure. From the reconstructed images, it is seen that the reflections from the object under inspection form a high intensity core region with a diffraction halo around it. By applying a threshold, a desired image is obtained as seen in FIGS. 11C and 11D for two displacements of 4 cm and 7.8 cm, respectively. In other words, from FIGS. 11C and 11D, displacement of the OUI from the center of the mechanical rotating platform is estimated. It is observed from FIGS. 11C and 11D, that the reconstructed 3D images form an ellipse (unlike an expected circle of diameter of 3.5 cm). However, from FIGS. 11A and 11B, it is observed that process of thresholding could not extract the desired image.

Table 1 below provides a comparison of an actual and an estimated displacement of the object under inspection. The displacements shown in the Table 1 are with respect to the center of the OUI's high-intensity region in horizontal cross-section.

TABLE 1

| Case | Actual Displacement (cm) | Estimated Displacement (cm) | Estimated Dimension (cm × cm) |
| --- | --- | --- | --- |
| 1 | 4 | 5.4 | 3.6 × 5.6 |
| 2 | 7.8 | 6.6 | 4.4 × 5.2 |

An estimated dimension for each case is also presented. However, the dimension estimation is critically dependent on threshold level. Therefore, the method of the present disclosure is used for only an approximate estimation of the shape and size of the object under inspection. While the estimated displacements shown in Table 1 deviate from their actual values, separation of two displacement centers are clearly seen from estimated figures. The displacement and size estimations in this case have been affected by poor horizontal resolution due to omnidirectional nature of the antennas (leading to wide field of view), large wavelengths (6.25 cm to 9.67 cm) and the OUI's radar cross-section (RCS) (in terms of circumference and height) being comparable to wavelength, leading to Mie-scattering region, where the RCS is oscillatory with frequency. In conventional systems where similar radar is used, it is shown that the minimum object size that is identifiable is 12 mm×30 mm×70 mm, though a higher gain directional antipodal Vivaldi antenna is used. Further, conventionally an improved DAS algorithm is used to detect tumor of the RCS given by circumference/$\lambda$=2.4. However, the modified DAS of the present disclosure demonstrates the detection of objects with smaller RCS≈1.5 in comparison to the conventional systems.

FIGS. 12A through 12D show simulation results for the case where the starting angular locations of the object under inspection are kept at 0°, 90°, 180° and 270°, respectively, according to some embodiments of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure provides a systems and methods for non-intrusive material quality inspection using three-dimensional monostatic radar based imaging. The method of the present disclosure utilizes ISAR microwave imaging using a single monostatic UWB impulse radar, where the object under inspection (OUI) (a cylindrical plastic container densely packed with metallic ball bearings in the present disclosure) undergoes the circular motion on the mechanical rotating platform. To image an observation plane, a modified DAS algorithm is used in the resent disclosure that is built upon a concept of virtual antenna positions forming an array surrounding a target OUI. Thus, the present disclosure provides a method for estimating a target object's shape, size and its radial and angular displacement with respect to a fixed reference point. The method of the present disclosure is able to detect an object with smaller RCS in comparison to conventional methods. Moreover, despite near-field effects and phase errors, a method of microwave imaging by virtual radar aperture creation is described in the present disclosure. The method of the present disclosure could be used in chemical, food, paint and many manufacturing units for material inspection, quality check and control.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system comprising:
    a mechanical rotating platform;
    an object under inspection positioned on the mechanical rotating platform;
    a single static radar positioned at a positioned at a predefined inclination from the object under inspection and the mechanical rotating platform; and
    a controller unit in communication with the single static radar, wherein the controller unit comprises:
        one or more data storage devices configured to store instructions;
        one or more communication interfaces; and
        one or more hardware processors operatively coupled to the one or more data storage devices via the one or more communication interfaces, wherein the one or more hardware processors are configured by the instructions to:
            (i) acquire, a first set of radar return data from a first reflected signal and a second set of radar return data from a second reflected signal, the first reflected signal being a signal reflected off a first sample setup and the second reflected signal being a signal reflected off a second sample setup in response to a transmitted signal from the single static radar positioned at a predefined inclination from the first sample setup and the second sample setup, wherein the first sample set up comprises the mechanical rotating platform and the second sample set up comprises the object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix;
            (ii) perform, a non-coherent subtraction between the first set of radar return data and the second set of radar return data to obtain a resultant radar return data, wherein resultant radar return data is indicative of a background subtracted range time matrix;
            (iii) perform, a plurality of preprocessing steps on the resultant radar return data to obtain a processed range time matrix;
            (iv) apply, a range-doppler processing technique on the processed range time matrix to obtain a range-gated matrix indicative of a range time matrix constrained to an observation window;
            (v) create a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar;
            (vi) iteratively perform steps (i) through (v) to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights; and
            (vii) obtain, a three-dimensional reconstructed image of the object under inspection by combining the plurality of transverse plane images.

2. The system of claim 1, wherein the one or more hardware processors are further configured to
obtain, a 3D reflection intensity map of the object under inspection by using (i) a boundary detection technique and (ii) a thresholding technique;
create, a 3D heatmap view model using the 3D reflection intensity map of the object under inspection for visualization of the sample material placed inside the object under inspection; and
identify, at least one of (i) a high intensity location and (ii) a location with change detection in the 3D heatmap view model to identify one or more anomalies in the sample material placed inside the object under inspection.

3. The system of claim 1, wherein the one or more hardware processors are further configured to use the resultant set of radar return data to determine an initial three-dimensional reconstructed image of the object under inspection.

4. The system of claim 1, wherein the plurality of preprocessing steps comprise performing motion filtering, mean subtraction, and envelope detection on the resultant radar return data.

5. The system of claim 1, wherein the plurality of virtual antenna positions of the single static radar is indicative of virtual motion of the single static radar around the object under investigation in a virtual circular trajectory.

6. A processor implemented method, comprising:
acquiring, via one or more hardware processors, a first set of radar return data from a first reflected signal and a second set of radar return data from a second reflected signal, the first reflected signal being a signal reflected off a first sample setup and the second reflected signal being a signal reflected off a second sample setup in response to a transmitted signal from a single static radar positioned at a predefined inclination from the first sample setup and the second sample setup, wherein the first sample set up comprises a mechanical rotating platform and the second sample set up comprises an object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix;
performing, via the one or more hardware processors, a non-coherent subtraction between the first set of radar return data and the second set of radar return data to obtain a resultant radar return data, wherein resultant radar return data is indicative of a background subtracted range time matrix;
performing, via the one or more hardware processors, a plurality of preprocessing steps on the resultant radar return data to obtain a processed range time matrix;
applying, via the one or more hardware processors, a range-doppler processing technique on the processed range time matrix to obtain a range-gated matrix indicative of a range time matrix constrained to an observation window;
creating, via the one or more hardware processors, a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar;
iteratively performing, via the one or more hardware processors, steps of acquiring the first set of radar return data and the second set of radar return data to creating the transverse plane image of the object under inspection to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights; and
obtaining, via the one or more hardware processors, a three-dimensional reconstructed image of the object under inspection by combining the plurality of transverse plane images.

7. The method of claim 6, further comprising:
obtaining, a 3D reflection intensity map of the object under inspection by using (i) a boundary detection technique and (ii) a thresholding technique;
creating, a 3D heatmap view model using the 3D reflection intensity map of the object under inspection for visualization of the sample material placed inside the object under inspection; and
identifying, at least one of (i) a high intensity location and (ii) a location with change detection in the 3D heatmap view model to identify one or more anomalies in the sample material placed inside the object under inspection.

8. The method of claim 6, wherein the resultant set of radar return data is used to determine an initial three-dimensional reconstructed image of the object under inspection.

9. The method of claim 6, wherein the plurality of preprocessing steps comprise performing motion filtering, mean subtraction, and envelope detection on the resultant radar return data.

10. The method of claim 6, wherein the plurality of virtual antenna positions of the single static radar is indicative of virtual motion of the single static radar around the object under investigation in a virtual circular trajectory.

11. One or more non-transitory computer readable mediums comprising one or more instructions which when executed by one or more hardware processors cause:
acquiring, a first set of radar return data from a first reflected signal and a second set of radar return data from a second reflected signal, the first reflected signal being a signal reflected off a first sample setup and the second reflected signal being a signal reflected off a second sample setup in response to a transmitted signal from a single static radar positioned at a predefined inclination from the first sample setup and the second sample setup, wherein the first sample set up comprises a mechanical rotating platform and the second sample set up comprises an object under inspection positioned on the mechanical rotating platform with an offset to center thereof and undergoing a circular translation motion during each rotation of the mechanical rotating platform, and wherein a sample material is placed inside the object under inspection and wherein the radar return data is in form a range time matrix;
performing, a non-coherent subtraction between the first set of radar return data and the second set of radar return data to obtain a resultant radar return data, wherein resultant radar return data is indicative of a background subtracted range time matrix;

performing, a plurality of preprocessing steps on the resultant radar return data to obtain a processed range time matrix;

applying, a range-doppler processing technique on the processed range time matrix to obtain a range-gated matrix indicative of a range time matrix constrained to an observation window;

creating, a transverse plane image of the object under inspection at a predefined height of the single static radar by applying a modified Delay-and-Sum algorithm on the range-gated range-time matrix, wherein the modified Delay-and-Sum algorithm determines a plurality of virtual antenna positions of the single static radar around the object under inspection and a distance of each pixel of the transverse plane image from each of the plurality of virtual antenna positions of the single static radar;

iteratively performing, steps of acquiring the first set of radar return data and the second set of radar return data to creating the transverse plane image of the object under inspection to obtain a plurality of transverse plane images of the object under inspection at a plurality of virtual heights of the single static radar, wherein the plurality of virtual heights of the single static radar is indicative of a plurality of transverse cross sections of object under inspection at a plurality of heights; and obtaining, a three-dimensional reconstructed image of the object under inspection by combining the plurality of transverse plane images.

12. The non-transitory computer readable mediums of claim 11, further comprising:

obtaining, a 3D reflection intensity map of the object under inspection by using (i) a boundary detection technique and (ii) a thresholding technique;

creating, a 3D heatmap view model using the 3D reflection intensity map of the object under inspection for visualization of the sample material placed inside the object under inspection; and identifying, at least one of (i) a high intensity location and (ii) a location with change detection in the 3D heatmap view model to identify one or more anomalies in the sample material placed inside the object under inspection.

13. The non-transitory computer readable mediums of claim 11, wherein the resultant set of radar return data is used to determine an initial three-dimensional reconstructed image of the object under inspection.

14. The non-transitory computer readable mediums of claim 11, wherein the plurality of preprocessing steps comprise performing motion filtering, mean subtraction, and envelope detection on the resultant radar return data.

15. The non-transitory computer readable mediums of claim 11, wherein the plurality of virtual antenna positions of the single static radar is indicative of virtual motion of the single static radar around the object under investigation in a virtual circular trajectory.

* * * * *